(12) United States Patent
Huang et al.

(10) Patent No.: US 10,671,162 B1
(45) Date of Patent: Jun. 2, 2020

(54) EYEBALL TRACKING MODULE FOR VIDEO GLASSES

(71) Applicant: BEIJING 7INVENSUN TECHNOLOGY CO., LTD., Beijing (CN)

(72) Inventors: Tongbing Huang, Beijing (CN); Yunfei Wang, Beijing (CN)

(73) Assignee: BEIJING 7INVENSUN TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/782,086

(22) Filed: Feb. 5, 2020

Related U.S. Application Data

(63) Continuation of application No. 16/090,211, filed as application No. PCT/CN2016/110423 on Dec. 16, 2016, now Pat. No. 10,613,625.

(30) Foreign Application Priority Data

Apr. 6, 2016 (CN) ...................... 2016 2 0276979 U

(51) Int. Cl.
*G09G 1/00* (2006.01)
*G06F 3/01* (2006.01)
(Continued)

(52) U.S. Cl.
CPC ............. *G06F 3/013* (2013.01); *G02B 5/208* (2013.01); *G02B 27/0093* (2013.01);
(Continued)

(58) Field of Classification Search
CPC .............. G06F 3/01; G06K 9/00; G02B 27/01
See application file for complete search history.

(56) References Cited

U.S. PATENT DOCUMENTS

| 8,971,570 B1* | 3/2015 | Raffle ..................... G06F 3/013 382/103 |
| 2003/0142041 A1* | 7/2003 | Barlow .................. A61B 3/113 345/8 |

FOREIGN PATENT DOCUMENTS

| CN | 202533948 U | 11/2012 |
| CN | 103690146 A | 4/2014 |
| (Continued) | | |

OTHER PUBLICATIONS

International Search Report for PCT application No. PCT/CN2016/110423 filed on Dec. 16, 2016, dated Mar. 16, 2017.
(Continued)

*Primary Examiner* — Michael A Faragalla
(74) *Attorney, Agent, or Firm* — Gang Yu

(57) ABSTRACT

An eyeball tracking module for video glasses, including: at least two infrared light sources, at least one image sensor assembly and at least one infrared cut-off filtering device. Each of the image sensor assembly comprises an image sensor body and an infrared filter provided in front of the image sensor body. The at least two infrared light sources are fixedly provided in an area laterally in front of an eyeball and are used for emitting infrared light to the eyeball, so as to form, on the eyeball which reflects the infrared light, a reflection point. The at least one image sensor assembly is fixedly provided at an edge or outside of a visual angle of video glasses. The at least one infrared cut-off filtering device is provided in an overlapping area between a reflection light path of the eyeball and an acquisition area of an image sensor.

20 Claims, 2 Drawing Sheets

(51) Int. Cl.
*G02B 5/20* (2006.01)
*G06K 9/00* (2006.01)
*G02B 27/01* (2006.01)
*G02B 27/00* (2006.01)

(52) U.S. Cl.
CPC .......... *G02B 27/0101* (2013.01); *G06F 3/01* (2013.01); *G06K 9/00* (2013.01); *G06K 9/00335* (2013.01); *G06K 9/00604* (2013.01); *G02B 27/0172* (2013.01)

(56) References Cited

FOREIGN PATENT DOCUMENTS

| | | |
|---|---|---|
| CN | 104921697 A | 9/2015 |
| CN | 105242773 A | 1/2016 |
| CN | 205594581 U | 9/2016 |
| JP | 2004012501 A | 1/2004 |
| JP | 2015013031 A | 1/2015 |
| WO | 2012008966 A1 | 1/2012 |
| WO | 2015198477 A1 | 12/2015 |
| WO | 2015198502 A1 | 12/2015 |
| WO | 2017090203 A1 | 6/2017 |

OTHER PUBLICATIONS

JP first Office Action dated Sep. 17, 2019 re: Application No. 2019-503606, pp. 1-9.

* cited by examiner

EYEBALL TRACKING MODULE FOR VIDEO GLASSES

TECHNICAL FIELD

The disclosure belongs to a technical field of eyeball tracking, and particularly relates to an eyeball tracking module for video glasses.

BACKGROUND

Eyeball tracking is a technology for getting a present 'gazing direction' of a subject by using various detection means, such as machinery, electrons and optics. With the rapid development of a computer vision, an artificial intelligence technology and a digital technology, the eyeball tracking technology has become a hotspot research field at present, and has an extensive application in the man-machine interaction field, for example, the eyeball tracking technology may be applied to vehicle auxiliary driving, virtual reality and cognitive disorder diagnosis and the like.

A related eyeball tracking device generally has the defects of complicated structure, large occupied space and limited eyeball tracking precision and the like.

SUMMARY

In allusion to the existing defects in the related art, some embodiments of the disclosure provide an eyeball tracking module for video glasses, and are capable of effectively solving the above problems.

The technical scheme used by an embodiment of the disclosure is as follows.

Some embodiment of the disclosure provide an eyeball tracking module for video glasses, including: at least two infrared light supplies, at least one image sensor assembly and at least one infrared cut-off filtering device; the image sensor assembly includes an image sensor body and an infrared filter arranged in front of the image sensor body.

The at least two infrared light supplies are fixedly provided in an area laterally in front of an eyeball and are used for emitting infrared light to the eyeball, so as to form, on the eyeball which reflects the infrared light, a reflection point.

The at least one image sensor assembly is fixedly provided at an edge or outside of a visual angle of video glasses; the at least one infrared cut-off filtering device is provided in an overlapping area between a reflection light path of the eyeball and an acquisition area of an image sensor, and is used for reflecting an eyeball image to the image sensor body, so that the image sensor body collects the eyeball image.

In an exemplary embodiment, an outside of a visual angle of the eyeball is provided with at least one lens; the at least one lens is provided on a transmission light path between the at least one infrared cut-off filtering device and the at least one image sensor assembly, and is used to eliminate distortion and/or compensate an restoring image.

In an exemplary embodiment, the at least one infrared cut-off filtering device is integrated on a screen surface of a display screen; and/or the at least one infrared cut-off filtering device is an infrared light reflecting coating or an infrared light reflecting film of a display screen.

In an exemplary embodiment, the at least one infrared cut-off filtering device is fixedly provided in a area between an eye lens of the video glasses and the display screen, and an edge of the at least one infrared cut-off filtering device is positioned on the outside of the visual angle of the video glasses.

In an exemplary embodiment, the infrared light sources are fixedly provided on the outside of the visual angle of the video glasses; and the at least two infrared light supplies are sleeved on a housing of the edge of the eye lens of the video glasses.

In an exemplary embodiment, a video glasses housing is provided with an installing groove; the image sensor assembly is fixed on the video glasses housing through the installing groove.

In an exemplary embodiment, the eyeball tracking module further includes a main control unit, the main control unit is respectively connected with the at least two infrared light supplies and the at least one image sensor assembly.

In an exemplary embodiment, the at least two infrared light supplies are connected to the main control unit through a first interface; the first interface is a one-way interface through which the main control unit sends a control signal to the at least two infrared light supplies; and/or the first interface is an interface with a power supply function.

The at least one image sensor assembly is connected to the main control unit through a second interface; the second interface is a bi-directional interface through which a control signal and/or a data signal is transmitted between the main control unit and the at least one image sensor assembly; and/or the second interface is an interface with a power supply function.

In an exemplary embodiment, the eyeball tracking module is a single-eyeball tracking module or a double-eyeball tracking module.

In an exemplary embodiment, in a case where the eyeball tracking module is the single-eyeball tracking module, the eyeball tracking module includes a single-eyeball infrared light source, at least one single-eyeball image sensor assembly and at least one single-eyeball infrared cut-off filtering device.

In a case where the eyeball tracking module is the double-eyeball tracking module, the eyeball tracking module includes a left eyeball infrared light supply, at least one left eyeball image sensor assembly, at least one left eyeball infrared cut-off filtering device, a right eyeball infrared light supply, at least one right eyeball image sensor assembly and at least one right eyeball infrared cut-off filtering device.

The left eyeball image sensor assembly and the right eyeball image sensor assembly are independently provided, or share a same image sensor assembly.

The left eyeball infrared cut-off filtering device and the right eyeball infrared cut-off filtering device are independently provided, or share a same infrared cut-off filtering device.

In an exemplary embodiment, the double-eyeball tracking module further comprises a left eyeball main control unit and a right eyeball main control unit; the left eyeball main control unit is respectively connected with the left eyeball infrared light supply and the at least one left eyeball image sensor assembly; the right eyeball main control unit is respectively connected with the right eyeball infrared light supply and the at least one right eyeball image sensor assembly.

In an exemplary embodiment, the left eyeball main control unit and the right eyeball main control unit are independently installed, or integrated together as a main control unit.

The eyeball tracking module for the video glasses provided by the disclosure has the following advantages:

simple structure, small occupied space and high eyeball tracking precision.

The above drawings include the following drawing marks:

1: infrared light source; 2: image sensor assembly; 2-1: image sensor body; 2-2: infrared filter; 3: infrared cut-off filtering device; 4: circular ring; 5: eye lens; 6: main control unit; 7: video glasses housing; 7-1: installing groove; 8: display screen; 9: lens; 10: eyeball

DETAILED DESCRIPTION OF THE EMBODIMENTS

In order to make technical problems, technical schemes and beneficial effects solved by the disclosure clearer, the disclosure is further described in detail in combination with the drawings and embodiments. It is to be understood that the specific embodiments described herein are merely used for explaining the disclosure, and not intended to limit the disclosure.

Some embodiments of the present disclosure provide an eyeball tracking module for video glasses, which may be provided in a virtual reality glasses device, through a unique design of an interior structure of the virtual reality glasses, the eyeball tracking is achieved, so while a user watches a display terminal positioned in front of the glasses by wearing the glasses, the display terminal may be operated and controlled on the basis of an eyeball tracking technology, and the functions of man-machine interaction and fixation point rendering and the like are realized.

Figure 1:
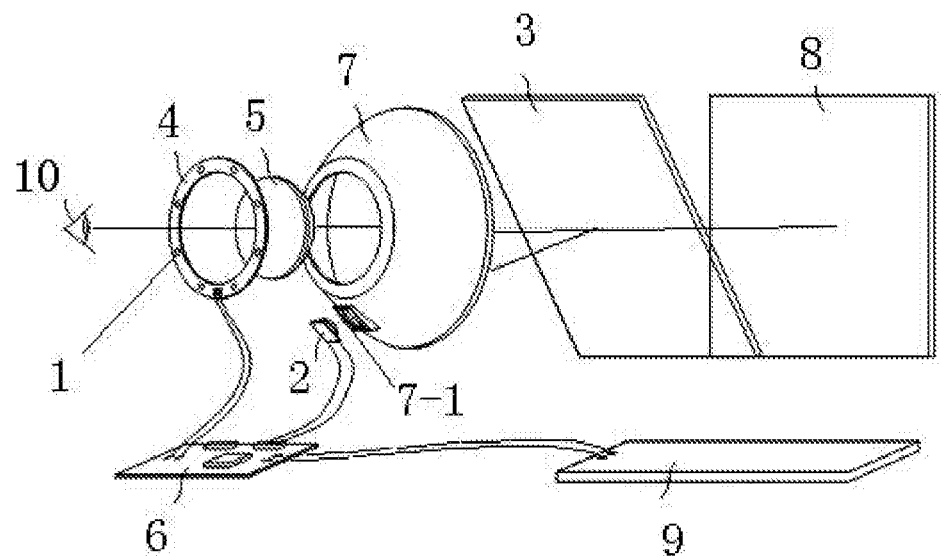
FIG. 1 is a three-dimensional structure diagram of a single-eyeball tracking module provided by an embodiment of the disclosure.
Figure 4:
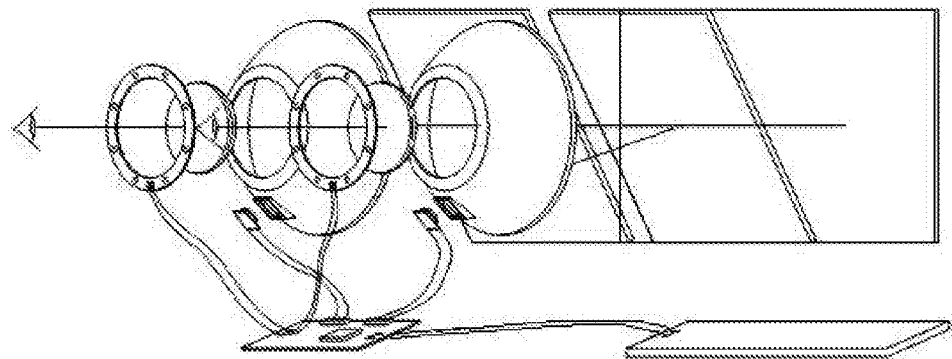
FIG. 4 is a three-dimensional structure diagram of a double-eyeball tracking module provided by the disclosure.

The eyeball tracking module for the video glasses provided by an embodiment of the disclosure may be a single-eyeball tracking module, or a double-eyeball tracking module, FIG. 1 is a structure schematic diagram of the single-eyeball tracking module, and FIG. 4 is a structure schematic diagram of the double-eyeball tracking module. Because the double-eyeball tracking module is a product formed by integrating two single-eyeball tracking modules together, a realizing principle of the double-eyeball tracking module is basically the same as that of the single-eyeball tracking module, so, for convenient description, the single-eyeball tracking module is used as an example for description below.

Figure 2:
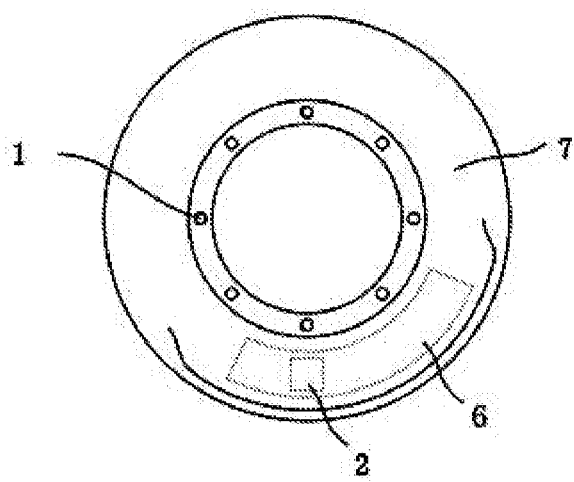
FIG. 2 is a vertical view diagram of the assembly of an infrared light source and a video glasses housing provided by an embodiment of the disclosure.
Figure 3:
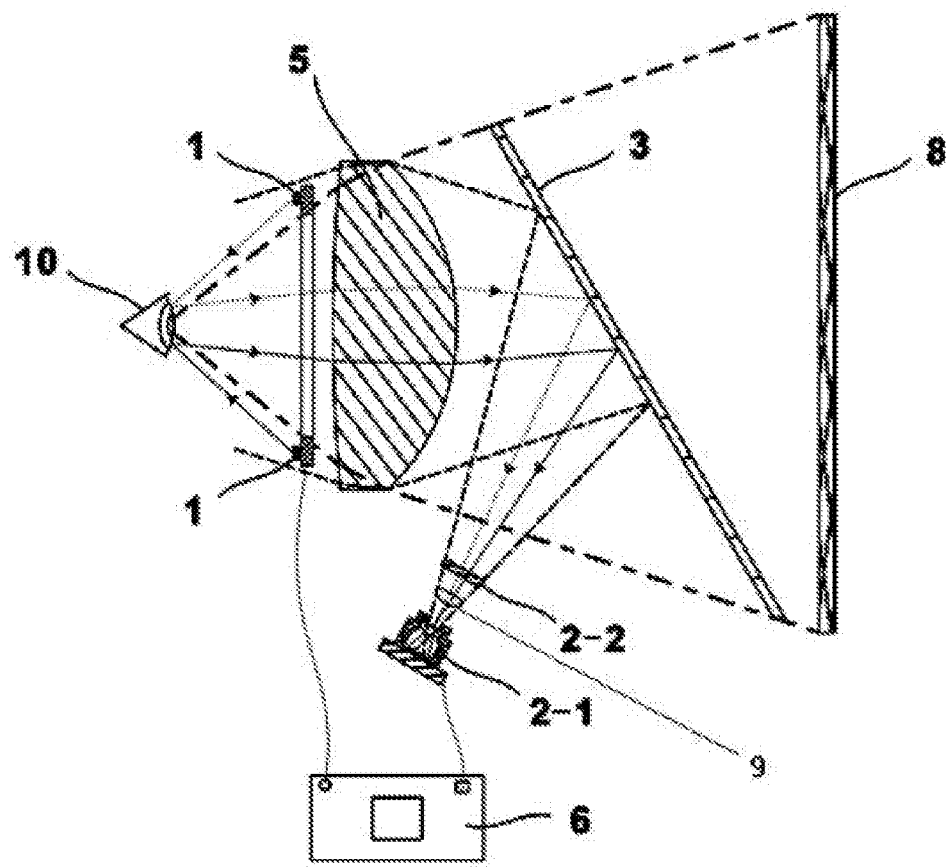
FIG. 3 is an imaging light path schematic diagram in a single-eyeball tracking module provided by an embodiment of the disclosure.

In combination with FIG. 1 to FIG. 3, some embodiments of the disclosure provide an eyeball tracking module for the video glasses, the eyeball tracking module for the video glasses includes at least two infrared light supplies 1, at least one image sensor assembly 2 and at least one infrared cut-off filtering device 3; each of the at least two image sensor assembly 2 includes an image sensor body 2-1 and an infrared filter 2-2 provided in front of the image sensor body 2-1.

The infrared light supplies 1 are fixedly provided in a area laterally in front of an eyeball 10 and are used to emit infrared light to the eyeball 10, so as to form, on the eyeball 10 which reflects the infrared light, a reflection point.

The image sensor assembly 2 is fixedly provided at an edge or outside of a visual angle of video glasses; an infrared cut-off filtering device 3 is provided in an overlapping area between a reflection light path of the eyeball and an acquisition area of an image sensor, and is used to reflect an eyeball image to the image sensor body 2-1, such that the image sensor body 2-1 collects the eyeball image.

As shown in FIG. 3, an imaging light path of the eyeball tracking module is as follows.

(1) The infrared light supplies 1 emit the infrared light to the eyeball 10, the eyeball 10 reflects the infrared light, so as to form, on the eyeball 10, the reflection point.

Specifically, a wavelength perceived by human eyes is 380-780 nm, in order not to affect people to normally watch the display terminal, the infrared light supplies are basically selected from near-infrared light supplies with low human eye sensitivity and small hazard.

(2) After the reflection point formed on the eyeball 10 is reflected by the infrared cut-off filtering device 3, the reflection point is imaged on the image sensor assembly;

Herein, in order to eliminate the effect of light in other wavelengths to an image, an infrared filter needs to be additionally provided in front of an imaging lens, only light emitted by an LED light supply is allowed to pass through the imaging lens.

About the virtual reality glasses in a present market, most of display terminals are directly provided at the direct rear end of an eye lens, and a lens of the image sensor assembly is provided at the direct rear end of the eye lens, such installing mode may affect the user to normally watch information of a display screen. In some embodiments of the disclosure, as shown in the drawings, an infrared cut-off filtering device is placed behind the eye lens, an angle of the infrared cut-off filtering device is adjusted, near-infrared light reflected by the eyeball 10 is reflected to the imaging lens fixed on the side face of a housing, the size of the infrared cut-off filtering device is selected on the basis of containing the maximum field-of-view edge light of the eye lens.

Through the above providing mode, on the one hand, while the eyeball tracking is performed, the user may not be affected to normally watch the Information of the display screen; on the other hand, because the image sensor assembly is provided on the edge or outside of a visual angle of the video glasses.

In an exemplary embodiment, the video glasses housing 7 is provided with an Installing groove 7-1, an Image sensor is fixed on the video glasses housing 7 through the installing groove 7-1, so the installation of the image sensor is convenient and an additional space is not occupied, and a volume of the whole device is saved.

In a practical application, on the basis of the above structure, the following Improvements may be further performed.

In an exemplary embodiment: the outside of the eyeball visual angle is provided with at least one lens 9; the lens 9 is provided on a transmission light path between the Infrared cut-off filtering device 3 and the image sensor assembly 2, and is used to eliminate distortion and/or compensate an restoring Image, and improve the precision of an image collected by the image sensor.

In an exemplary embodiment: in order to further shrink an occupied volume of the whole device, the infrared cut-off filtering device 3 may be directly integrated on the screen surface of a display screen 8; and/or the infrared cut-off filtering device 3 is an infrared light reflecting coating or an infrared light reflecting film of the display screen.

In an exemplary embodiment: the infrared cut-off filtering device 3 is fixed in the area between the eye lens of the video glasses and the display screen, and the edge of the infrared cut-off filtering device 3 is positioned on the outside of the visual angle of the video glasses, it is guaranteed that the reflection points formed on any positions of the eyeball may be imaged to the image sensor through the infrared cut-off filtering device.

In an exemplary embodiment: the infrared light supplies 1 are provided on the outside of the visual angle of the video glasses; and the infrared light supplies 1 are fixedly sleeved on the housing of the edge of the video glasses eye lens 5. With such structure, the Infrared light supplies are easy to Install and the occupied space is small.

In an exemplary embodiment, as shown in FIG. 1, the infrared light supplies 1 may be sleeved on a circular ring 4 on the edge of the video glasses eye lens 5, the circular ring 4 may be an annular circuit board, or a housing body of the edge of the video glasses eye lens 5.

In an exemplary embodiment: there may further include a main control unit 6, the main control unit 6 is connected with the infrared light supplies 1 and the image sensor assembly 2 respectively.

It is to be noted that the main control unit related in the disclosure may be an independent main control circuit board; or a main control unit of terminals of a mobile phone, a panel personal computer and the like.

The infrared light supplies 1 are connected to the main control unit 6 through a first interface; the first interface is a one-way interface through which the main control unit 6 sends a control signal to the infrared light supplies 1; and/or the first interface is an interface with a power supply function.

The image sensor assembly 2 is connected to the main control unit 6 through a second interface; the second interface is a bi-directional interface through which a control signal and/or a data signal is transmitted between the main control unit 6 and the image sensor assembly 2; and/or the second interface is an interface with a power supply function.

In an exemplary embodiment: in a case where the eyeball tracking module is the double-eyeball tracking module, the eyeball tracking module includes a left eyeball infrared light supply, at least one left eyeball image sensor assembly, at least one left eyeball infrared cut-off filtering device, a right eyeball infrared light supply, at least one right eyeball image sensor assembly and at least one right eyeball infrared cut-off filtering device.

The left eyeball image sensor assembly and the right eyeball image sensor assembly are independently provided, or share a same image sensor assembly.

The left eyeball infrared cut-off filtering device and the right eyeball infrared cut-off filtering device are independently provided, or share a same infrared cut-off filtering device.

The double-eyeball tracking module further comprises a left eyeball main control unit and a right eyeball main control unit; the left eyeball main control unit is respectively connected with the left eyeball infrared light supply and the left eyeball image sensor assembly; the right eyeball main control unit is respectively connected with the right eyeball infrared light supply and the right eyeball image sensor assembly; the left eyeball main control unit and the right eyeball main control unit are independently installed, or integrated as a main control unit.

In other words, about the double-eyeball tracking module, the left eyeball tracking unit and the right eyeball tracking unit may share partial same device, so that the cost of the double-eyeball tracking module is reduced.

This shows that the eyeball tracking module for the video glasses provided by the disclosure has the following advantages of simple structure, small occupied space and high eyeball tracking precision.

The above is only preferable embodiments of the disclosure, it is to be noted that about those of ordinary skill in the art, under the precondition without departing from the principle of the disclosure, a plurality of improvements and modifications may be performed, and the improvements and modifications are also included within the scope of protection of the disclosure.

What is claimed is:

1. An eyeball tracking module for video glasses, comprising: at least two infrared light supplies, at least one image sensor assembly and at least one infrared cut-off filtering device; each of the at least one image sensor assembly comprises an image sensor body and an infrared filter provided in front of the image sensor body;
   wherein the at least two infrared light supplies are fixedly provided in a area laterally in front of an eyeball and are used for emitting infrared light to the eyeball, so as to form, on the eyeball which reflects the infrared light, a reflection point;
   the at least one image sensor assembly is fixedly provided at an edge or outside of a visual angle of video glasses; the at least one infrared cut-off filtering device is provided in an overlapping area between a reflection light path of the eyeball and an acquisition area of an image sensor, and is used for reflecting an eyeball image to the image sensor body, such that the image sensor body collects the eyeball image;
   wherein the at least one infrared cut-off filtering device is integrated on a screen surface of a display screen; and/or
   the at least one infrared cut-off filtering device is an infrared light reflecting coating or an infrared light reflecting film of a display screen;
   wherein the at least two infrared light supplies are fixedly provided on the outside of the visual angle of the video glasses; and the at least two infrared light supplies are provided on a housing of an edge of an eye lens of the video glasses in a sleeve manner.

2. The eyeball tracking module for the video glasses as claimed in claim 1, wherein an outside of a visual angle of the eyeball is provided with at least one lens; the at least one lens is provided on a transmission light path between the at least one infrared cut-off filtering device and the at least one image sensor assembly, and is used to eliminate distortion and/or compensate an restoring image.

3. The eyeball tracking module for the video glasses as claimed in claim 1, wherein the at least one infrared cut-off filtering device is fixedly provided in an area between an eye lens of the video glasses and the display screen, and an edge of the at least one infrared cut-off filtering device is positioned on the outside of the visual angle of the video glasses.

4. The eyeball tracking module for the video glasses as claimed in claim 1, wherein a video glasses housing is provided with a mounting groove; the at least one image sensor assembly is fixed on the video glasses housing through the mounting groove.

5. The eyeball tracking module for the video glasses as claimed in claim 1, wherein the eyeball tracking module further comprises a main control unit, the main control unit is respectively connected with the at least two infrared light sources and the at least one image sensor assembly.

6. The eyeball tracking module for the video glasses as claimed in claim 5, wherein the at least two infrared light supplies are connected to the main control unit through a first interface; wherein the first Interface is a one-way Interface through which the main control unit sends a control signal to the at least two Infrared light supplies; and/or the first interface is an interface with a power supply function;

the at least one image sensor assembly is connected to the main control unit through a second interface; wherein, the second Interface is a bi-directional Interface through which a control signal and/or a data signal is transmitted between the main control unit and the at least one image sensor assembly; and/or the second interface is an interface with a power supply function.

7. The eyeball tracking module for the video glasses as claimed in claim 1, wherein the eyeball tracking module is a single-eyeball tracking module or a double-eyeball tracking module.

8. The eyeball tracking module for the video glasses as claimed in claim 7, wherein in a case where the eyeball tracking module is the single-eyeball tracking module, the eyeball tracking module comprises a single-eyeball Infrared light supply, at least one single-eyeball image sensor assembly and at least one single-eyeball infrared cut-off filtering device;

In a case where the eyeball tracking module is the double-eyeball tracking module, the eyeball tracking module comprises a left eyeball Infrared light supply, at least one left eyeball image sensor assembly, at least one left eyeball infrared cut-off filtering device, a right eyeball infrared light supply, at least one right eyeball image sensor assembly and at least one right eyeball infrared cut-off filtering device;

the left eyeball Image sensor assembly and the right eyeball image sensor assembly are independently provided, or share a same image sensor assembly;

the at least one left eyeball infrared cut-off filtering device and the at least one right eyeball infrared cut-off filtering device are independently provided, or share a same infrared cut-off filtering device.

9. The eyeball tracking module for the video glasses as claimed in claim 8, wherein the double-eyeball tracking module further comprises a left eyeball main control unit and a right eyeball main control unit; the left eyeball main control unit is respectively connected with the left eyeball infrared light supply and the at least one left eyeball image sensor assembly; the right eyeball main control unit is respectively connected with the right eyeball infrared light supply and the at least one right eyeball image sensor assembly.

10. The eyeball tracking module for the video glasses as claimed in claim 9, wherein the left eyeball main control unit and the right eyeball main control unit are independently installed, or integrated together as a main control unit.

11. An eyeball tracking module for video glasses, comprising: at least two infrared light supplies, at least one image sensor assembly and at least one infrared cut-off filtering device;

wherein the at least two infrared light sources are fixedly provided in a area laterally in front of an eyeball and are used for emitting infrared light to the eyeball, so as to form, on the eyeball which reflects the infrared light, a reflection point;

the at least one infrared cut-off filtering device is provided in an overlapping area between a reflection light path of the eyeball and an acquisition area of an image sensor, and is used for reflecting an eyeball image to the at least one image sensor assembly, such that the at least one image sensor assembly collects the eyeball image;

wherein the at least one infrared cut-off filtering device is integrated on a screen surface of a display screen; and/or the at least one infrared cut-off filtering device is an infrared light reflecting coating or an infrared light reflecting film of the display screen;

wherein the at least two infrared light supplies are fixedly provided on an outside of a visual angle of the video glasses; and the at least two infrared light supplies are provided on a housing of an edge of an eye lens of the video glasses in a sleeve manner.

12. The eyeball tracking module for the video glasses as claimed in claim 11, wherein the at least one image sensor assembly is fixedly provided on an edge or outside of a visual angle of the video glasses.

13. The eyeball tracking module for the video glasses as claimed in claim 11, wherein an outside of the visual angle of the eyeball is provided with at least one lens; the at least one lens is provided on a transmission light path between the at least one infrared cut-off filtering device and the at least one image sensor assembly, and is used to eliminate distortion and/or compensate an restoring image.

14. The eyeball tracking module for the video glasses as claimed in claim 11, wherein a video glasses housing is provided with a mounting groove; the at least one image sensor assembly is fixed on the video glasses housing through the mounting groove.

15. The eyeball tracking module for the video glasses as claimed in claim 11, wherein the eyeball tracking module further comprises a main control unit, the main control unit is respectively connected with the at least two infrared light supplies and the at least one image sensor assembly.

16. The eyeball tracking module for the video glasses as claimed in claim 15, wherein the at least two infrared light supplies are connected to the main control unit through a first interface; wherein the first interface is a one-way interface through which the main control unit sends a control signal to the at least two infrared light supplies; and/or the first interface is an interface with a power supply function;

the at least one image sensor assembly is connected to the main control unit through a second interface; the second interface is a bi-directional interface through which a control signal and/or a data signal is transmitted between the main control unit and the at least one image sensor assembly; and/or the second interface is an interface with a power supply function.

17. The eyeball tracking module for the video glasses as claimed in claim 11, wherein the eyeball tracking module is a single-eyeball tracking module or a double-eyeball tracking module.

18. The eyeball tracking module for the video glasses as claimed in claim 17, wherein while the eyeball tracking module is the single-eyeball tracking module, the eyeball tracking module comprises a single-eyeball infrared light supply, at least one single-eyeball image sensor assembly and at least one single-eyeball infrared cut-off filtering device;

in a case where the eyeball tracking module is the double-eyeball tracking module, the eyeball tracking module comprises a left eyeball infrared light supply, at least one left eyeball image sensor assembly, at least one left eyeball infrared cut-off filtering device, a right eyeball infrared light supply, at least one right eyeball image sensor assembly and at least one right eyeball infrared cut-off filtering device;

the left eyeball image sensor assembly and the right eyeball image sensor assembly are independently provided, or share a same image sensor assembly;

the left eyeball infrared cut-off filtering device and the right eyeball infrared cut-off filtering device are independently provided, or share a same infrared cut-off filtering device.

19. The eyeball tracking module for the video glasses as claimed in claim 18, wherein the double-eyeball tracking module further comprises a left eyeball main control unit and a right eyeball main control unit; the left eyeball main control unit is respectively connected with the left eyeball infrared light supply and the left eyeball image sensor assembly; the right eyeball main control unit is respectively connected with the right eyeball infrared light supply and the right eyeball image sensor assembly.

20. The eyeball tracking module for the video glasses as claimed in claim 19, wherein the left eyeball main control unit and the right eyeball main control unit are independently installed, or integrated as a main control unit.

* * * * *